United States Patent Office 3,503,281
Patented Mar. 31, 1970

3,503,281
POWER TRANSMITTING PLANT WITH CONTROLLABLE FLUID COUPLING
Wilhelm Gsching and Dieter Rottmann, Hamburg-Altona, Germany, assignors to Voith Getrieb KG, Heidenheim, Germany
Filed Mar. 6, 1967, Ser. No. 621,062
Claims priority, application Germany, Mar. 8, 1966, 1,550,977
Int. Cl. F16h 37/00
U.S. Cl. 74—732    2 Claims

ABSTRACT OF THE DISCLOSURE

Low loss variable speed transmission with a planetary gear set and a controllable fluid coupling in series with the planetary gear set having three elements of which one receives power from a main drive motor, another supplies power to a driven working machine, while the third is driven at variable speed by a drive means so as to superimpose a control for modifying the speed of the working machine.

---

The present invention relates to a power transmitting plant with controllable fluid coupling for obtaining an output speed variable during operation, for instance, for electrically driven units of high output in connection with which low energy losses during the speed control are very important, particularly for driving boiler feed pumps.

Fluid couplings are able at constant driving speed, infinitely to vary the output speed, and more specifically by varying the slip, for instance, in view of a change in the degree of filling of the working chamber. Inasmuch as the slip control represents a loss control, the highest output speed obtained at the lowest slip from approximately 1.5 to 3.0 percent, is termed the most economic speed and is frequently called the normal speed. The speed control by changing the slip beyond a magnitude depending on the respective circumstances, especially at high outputs, is therefore economically no longer tolerable.

It is, therefore, an object of the present invention to provide a power transmitting plant which will overcome the above mentioned drawbacks.

With the above mentioned type of power transmission plants it is in some instances desirable to temporarily obtain an emergency speed or "over-speed" in excess of the maximum operational speed—full load speed. Sometimes the possibility of realizing such emergency speed is even prescribed by law as, for instance, in connection with boiler feed pumps.

A fluid coupling designed for such emergency speed or overspeed is still more uneconomical than the above mentioned instance, because already at the full load speed prevailing for the major portion of the operation, it operates at a higher slip than the minimum slip, and with each further speed reduction it operates with a still poorer degree of efficiency. A mechanical control transmission for controlling said over-speed would at least at high outputs present shifting difficulties.

It is a further object of the present invention to provide a power transmitting plant with a wide infinitely variable speed range of the output shaft at constant driving speed, which cannot be realized in an economical manner by a fluid coupling alone.

It is a further object to provide a power transmitting plant as set forth in the preceding paragraph in which the controllable speed range will also include an over-speed range in excess of the full load speed.

These and other objects and advantages of the invention will appear more clearly from the following specification, in connection with the accompanying drawings, in which:

FIGURE 1 represents a power transmitting plant with a hydraulically controllable superimposing transmission and with a variable and bridgeable fluid coupling following said superimposing transmission or interference drive.

FIGURE 2 diagrammatically shows a power transmitting plant with an electrically controlled superimposing transmission simultaneously serving as high velocity range, and with a variable fluid coupling following said transmission.

FIGURES 3 and 4 respectively illustrate two power transmitting plants with different superimposing transmissions and with a variable fluid coupling between the main motor and the superimposing transmission.

Figure 7:
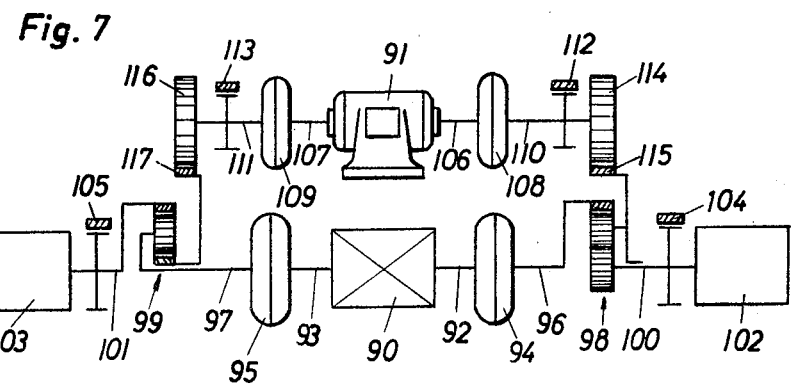

FIGURE 7 diagrammatically illustrates a power transmission plant in double arrangement with the main and auxiliary motors in common.

The power plant of the general type set forth above is characterized primarily by a planetary gear transmission of which, in a manner known per se, the first main member is connected to the drive motor, while the second main member is connected to a superimposing machine or overlapping machine variable in speed to a limited extent, whereas the third main member is connected to the output shaft. The power transmission plant according to the present invention is furthermore characterized in that the variable fluid coupling and the planetary gear transmission may be serially arranged in any desired sequence. The first main member is thus, if desired, connected to the driving motor through the fluid coupling. The superimposing machine may thus be designed as variable hydrostatic transmission or as speed variable electromachine (for instance with Leonard circuit).

Planetary gear transmissions serving as superimposing transmissions, with which the otherwise stationary third member is for purposes of superimposing driven or braked at infinitely variable speed, are known per se, while in many instances the speed control is effected by a variable hydrostatic transmission or a direct current machine with Leonard circuit. The superimposing machine in this instance operates as motor or as brake, and in some instances as a generator, depending on whether the output speed is higher or lower than the so-called base speed at which the superimposing machine is at a standstill. With these known transmissions, the superimposing machines are to be designed for the entire control range, whereby these transmissions, when wide control ranges are required, become unduly expensive and do no longer work as economically as with narrow control range. Furthermore, these transmissions, due to their relatively limited control range do not permit operation below the lower control range limit and thus do not permit a gradual starting of the working machine while the driving machine is running. Torsional vibrations are hardly suppressed or attenuated.

According to the present invention the speed range is subdivided into two partial ranges which means that neither the fluid coupling, nor the planetary gear transmission has to take over the entire speed control. With superimposing machines which themselves permit an infinitely variable speed control, for instance, with a variable hydrostatic transmission or with a direct current machine with Leonard control, the speed range is divided into an upper range controlled solely by the superimposing machine, and into a lower range controlled solely by the controllable fluid coupling. The arrangement is such that the partial range controlled by the fluid coupling is at any rate, even when it is intended to control down to the output speed zero, smaller than were the superimposing transmission was lacking. Consequently, the fluid coupling works more economically than with the heretofore known transmission having a fluid coupling only. The fluid coupling may furthermore be equipped with a bridging coupling adapted rigidly to connect the primary and secondary part. This arrangement makes it possible within the speed range, in which the fluid coupling otherwise operates with a minimum slip, to avoid even the latter. The close relationship between fluid coupling and superimposing transmission is furthermore determined by the fact that said superimposing transmission has to be designed only for a smaller limited control range whereby the rather high costs of the superimposing machine are considerably reduced. The fluid coupling furthermore permits without additional expenses to turn off the output shaft and to start with running driving motor. This possibility does not exist with a pure superimposing transmission or would at least necessitate rather expensive and complicated special devices. Due to the fact that the superimposing machine, for instance, the hydrostatic transmission is dimensioned smalled only for the limit control range, the overall degree of efficiency is increased and the cost for the superimposing which is in close relationship to the extent of the possible control, is considerably reduced.

The advantages of the heretofore known drive over a fluid coupling are maintained to the fullest extent. If the superimposing machine fails, the output shaft can after arresting the superimposing member of the planetary gear transmission be controlled solely by means of the fluid coupling. Also when the working machine has sustained damages, it is possible, in spite of the driving machine continuing to run quickly to turn off the arrangement. This is important for drives which cannot be turned off as, for instance, pump drive by a turbo-generator unit in steam power plants, and tandem installations with one motor and two working machines. In such an instance the fluid coupling is emptied and the output shaft is braked to a stop. If the superimposing member is permitted to rotate freely, the formation of air turbulence which with the large installations requires a cooling system, can be reduced in the empty fluid coupling.

The planetary gear transmission can be so designed that in addition to acting as superimposing transmission will also bring about the required transmission between driving motor and working machine. Finally, the oil return cooling installation of the fluid coupling can on the basis of the limited control range be dimensioned considerably smaller than would be the case if the fluid coupling would have to cover the entire control range.

The present invention also permits the employment of a superimposing machine which can be controlled in steps only. According to a particular embodiment of this last mentioned arrangement, the superimposing machine is designed as an ordinary electromotor-generator, which is reversible in its direction of rotation and is provided with a brake. Such electromotor-generator unit may preferably be in the form of a rotary current short-circuit rotor machine. The fluid coupling will be controlled only within the three speed ranges which are obtained by the speed (righthand and lefthand movement and standstill) of the electromotor-generator. Additional speed ranges can be realized by employing a pole reversible electric motor.

These steps are based on the finding that with a superimposing machine, a stepped speed change will suffice, if in the driving connection between the driving motor and the output shaft there is interposed a controllable fluid coupling. The electric motor by itself permits a speed control of the output shaft in steps only. Within the steps, however, it is possible by means of the fluid coupling to infinitely control. The smaller the steps of the speed range of the electric motor, the less the fluid coupling will have to be controlled. With a pole reversible and brake electric motor with two speeds in both directions, five steps are present. Thus, first five speeds of the output shaft are obtained. The fluid coupling works five times in the entire speed range of the output shaft in the area of the favorable minimum slip. By these speeds the fluid coupling is controlled downwardly five times. If an overspeed is desired, for instance the uppermost speed range of the output shaft is designed as overspeed range. At any rate, the superimposing transmission is so designed that full load speed and overspeed at a minimum slip of the fluid coupling can be realized.

The above outlined advantages of the transmission according to the invention may furthermore be augmented by the reference to the fact that the superimposing motor may be an ordinary standard electric motor. In this way the costs are reduced further. Also the weight of the power transmission plant can be effected favorably thereby. The speed may be adapted to the desired condition by corresponding gears.

Figure 1:
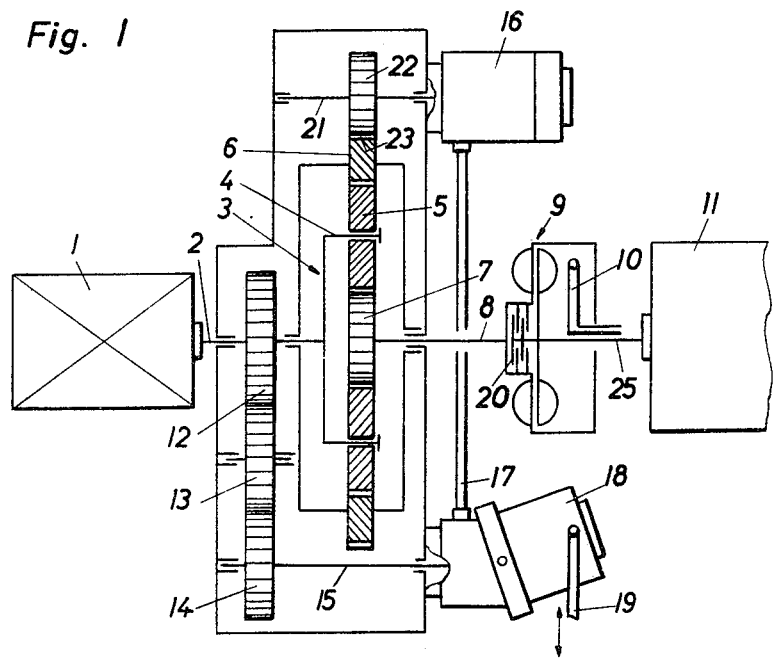

Referring now to the drawings in detail, the arrangement shown in FIG. 1 comprises a motor 1 which through a shaft 2 drives the planetary gear carrier 4 of a planetary gear transmission 3. The hollow wheel 6 of said planetary gear transmission 3 is drivingly connected through planetary gears 5 with the sun wheel 7 which latter is drivingly connected to a driven machine 11 through the intervention of an intermediate shaft 8, a fluid coupling 9 and a shaft 25, said fluid coupling 9 being adapted to be controlled as to its speed by means of a scoop 10. By means of a disc clutch 20, the two parts of the fluid coupling 9 can be positively engaged with each other and disengaged from each other. From shaft 2 there branches off a further drive through gears 12, 13 and 14 and a shaft 15 leading to a hydrostatic unit 18 which through a conduit 17 communicates with a further hydrostatic unit 16. Mounted on shaft 21 is a gear 22 meshing with a gear 23 on hollow wheel 6. The hydrostatic unit 18 is variable as to its delivery and absorption quantity by tilting its right-hand portion by means of a lever 19.

Figure 2:
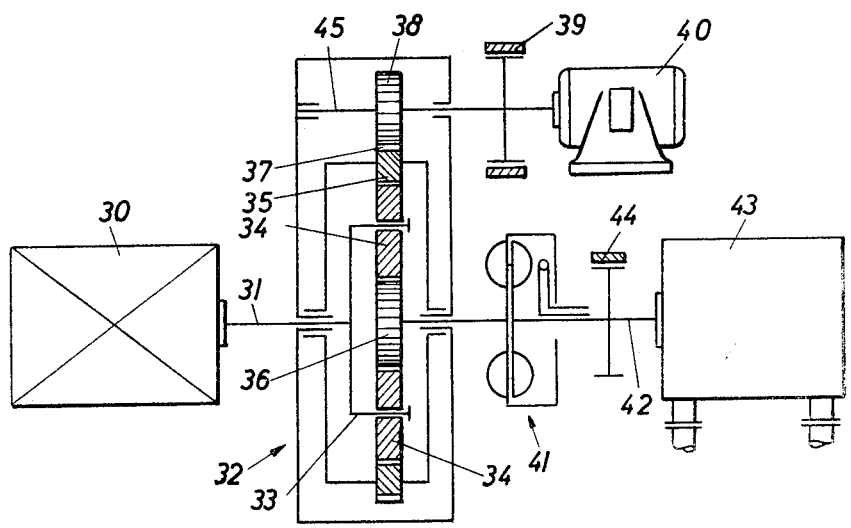

The power plant according to FIG. 2 comprises a motor 30 drivingly connected through a shaft 31 to the planetary gear carrier 33 carrying the planetary gears 34 of a planetary gear transmission 32. The hollow wheel 35 is through a pair of gears 37, 38 and a shaft 45 drivingly connected to a superimposing machine which is adapted to be braked by means of a brake 39. In the specific example shown in FIG. 2, the said superimposing machine is formed by an electric motor-generator 40 adapted to be controlled in a continuous manner by means of a Leonard circuit. The sun wheel 36 is drivingly connected to a boiler feed water pump 43 through a controllable fluid coupling 41 and the output shaft 42. The output shaft 42 is equipped with a brake 44 so that the pump 43 may be held stationary for purposes of repair while the driving motor 30 continues its operation. This breaking of the pump 43 is to a standstill for purposes of repair is necessary because even when the coupling is emptied, a slight movement of the pump in view of the ventilation would otherwise take place.

Figure 3:
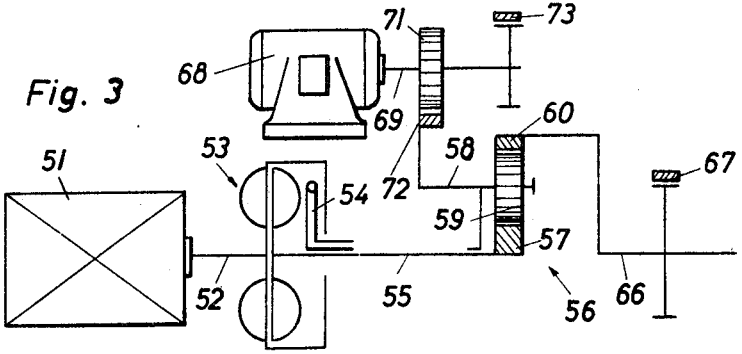
Figure 4:
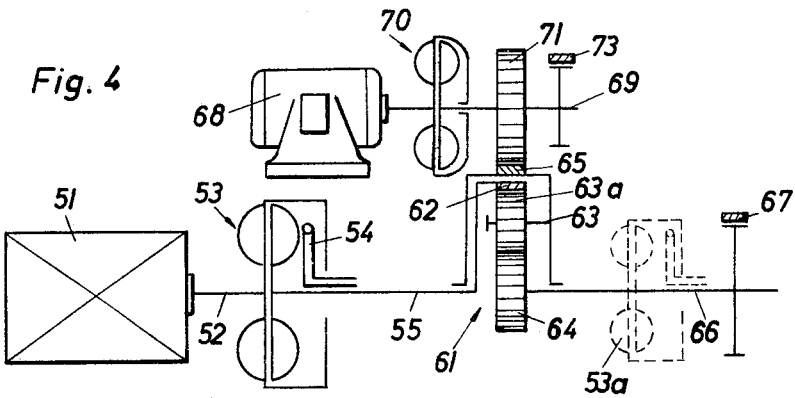

According to the power plants illustrated in FIGS. 3 and 4, there is provided a main motor 51 which through a shaft 52 drives the pump wheel of a fluid coupling 54 which is adapted to be controlled by a scoop 54. Coupling 53 is drivingly connected to the sun wheel 57 or the hollow wheel 62 of a planetary gear transmission 56, 61 respectively. The output shaft 66 which is adapted to be braked by a brake 67 is drivingly connected to the hollow wheel 60 and sun wheel 64 respectively of the planetary gear transmission 56 and 61 respectively shown in FIGS. 3 and 4. The third member of the planetary gear transmission, namely the planetary gear carrier 58, 63 respectively, equipped with the planetary gears 59 and 63a respectively, is drivingly connected with a pole reversible rotary current short circuit rotor 68. This is effected in conformity with FIG. 3 through spur gears 71 and 72 and is effected according to FIG. 4 through spur gears 65 and 71 and through an additional fluid coupling 70. In both transmissions of FIGS. 3 and 4, the third member is adapted by means of a brake 73 to be braked to a standstill.

The basic transmission ratio of the illustrated planetary gear transmissions 3, 32 and 61 (with the superimposing shaft 21, 45, 69 held stationary) is higher than 1. The superimposing transmissions thus simultaneously serve as step-up transmission as this is customary for instance for pump drives. The planetary gear transmission 56 according to FIG. 3 is so connected that when the superimposing shaft 69 is held stationary, the output shaft 66 will rotate at a lower speed than shaft 55. The provision of the fluid control coupling in the power path behind the superimposing transmission is with step-up output shafts effected in conformity with FIGS. 1 and 2. This permits a relatively small design of the fluid coupling. With high speeds of the driving motor and with too high output speeds (too high centrifugal forces on the fluid coupling), it is preferred to arrange the fluid coupling ahead of the superimposing transmission, in conformity with FIGS. 3 and 4. The way of connecting the superimposing transmission likewise depends on the speeds. In this connection it should be kept in mind that it must be avoided that the planetary gear carrier will assume too high speeds.

With all power transmission plants according to FIGS. 1 to 4, it is possible infinitely to control the output speed by means of the various speeds of the superimposing member 6, 35, 58 and 63 respectively and the controllable fluid couplings 9, 41 and 53 respectively. With the arrangements according to FIGS. 1 and 2, the fluid coupling is kept completely filled during the control by the hydrostatic transmission 16, 18 and the electromachine 40 respectively at which time the fluid coupling will operate with a minimum slip. When a bridging coupling 20 is provided, the latter is made effective. When reaching the lower limit of the control range of the superimposing transmission, the speed of the output shaft is controlled downwardly by changing the filling of the fluid coupling. The superimposing transmission takes for instance care of the upper half of the required total control range of the output shaft while the fluid coupling takes care of the lower half of said total control range of the output shaft. In addition thereto, the fluid coupling can be controlled downwardly to the speed zero which is important when starting the working machine while the driving machine is running.

With the power plants illustrated in FIGS. 3 and 4, the continuous speed control of the superimposing member has been replaced by a stepwise speed control. To this end, there is provided a pole reversible electric motor-generator 68 which has two speed ranges each for clockwise and counterclockwise rotation. Furthermore, the superimposing member may be braked to a standstill by means of a brake 73. By controlling the speed of the superimposing member, first five different speeds of the output shaft 66 are obtained. Between these speeds, the fluid coupling 53 is so controlled that a stepless controll of the output shaft 6 will be realized over the entire control range. Assuming that the electric motor 68 is pole reversible and yields two speeds in each direction of rotation, for instance 750 and 1500 r.p.m., the sun wheel 64 or hollow wheel 60 can rotate at four different speeds which are taken advantage of for the superimposing of the basic transmission ratio. Said basic transmission ration is obtained when the planetary gear carriers 58 and 63 respectively are braked to a standstill (brake 73 being engaged). When a speed of 3000 r.p.m. is assumed for the main motor 51 and when a transmission ratio of for instance 1.53 is assumed for the basic transmission ratio of the planetary gear transmission 61 of FIG. 4, the output saft 66 will with the fluid coupling 53 completely filled and with a minimum slip of 2%, be driven at a speed of 4500 r.p.m. This speed will steplessly be reduced by reducing the degree of filling of the fluid coupling 53. The change in the degree of filling is necessary only to that speed which will also be obtained by making effective the low speed of the electric motor 68 (750 r.p.m.) working in this instance as generator, in the corresponding direction of rotation while the fluid coupling 53 is completely filled. This speed may for instance be 4275 r.p.m. which means that the control of the fluid coupling 53 is effected within narrow limits only, in this instance up to a slip of approximately 7.0%. Analogously, the remaining speeds of the output shaft 66 are realized by making effective the remaining speeds and directions of rotation of the electric motor 68. One direction of rotation of the electric motor 68 results in a higher and the other direction of rotation results in a lower speed of the output shaft 66 than the speed of 4500 r.p.m. at the basic transmission ratio. In the last mentioned instance, the electric motor 68 works as generator and feeds the network, whereas otherwise it operates as motor and withdraws current from the network.

In order to be able with this transmission design to use small fluid couplings with low speed driving motors, it would be expedient to arrange the same not where indicated in solid lines in FIG. 4 but on the high speed output shaft 66 as indicated by the fluid coupling 53a shown in dash lines. The fluid coupling arranged between the driving motor and the planetary gear transmission has the advantage that in case the transmission, even the planetary gear transmission, has suffered any damage, the driving machine may continue to run which fact is of particular importance for instance when the drive is effected through the main shaft of a turbogenerator set in steam power plants. In this instance, the fluid coupling 53 is emptied, brake 67 is engaged and the electric motor 68 is turned off. Another advantage obtained in this connection consists in that the intermediate shaft 55 can freely rotate whereby the turbine wheel of the emptied fluid coupling 53 can adapt itself to the pump wheel speed and the formation of air turbulence and thus the heating in the working chamber of said coupling will remain low.

Figure 5:
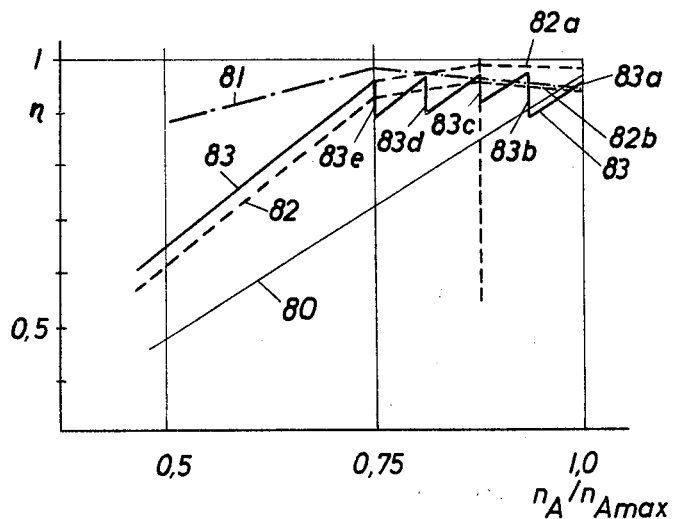
FIGURE 5 represents a graph showing the degree of efficiency over the ratio speed: maximum speed on output shaft with heretofore known control types on one hand, and according to the invention on the other hand.

FIG. 5 illustrates by way of a graph the degree of efficiency $\eta$ over the speed range of the output shaft with different power plants and, more specifically, with power plants as heretofore known (curves 80 and 81) and with such power plants as set forth in the present application (curves 82 and 83). There is assumed a speed control range of the output shaft of from 50 to 100%, in other words, from 0.5 to 1.0 of the ratio of the speed $n_A$ of the output shaft to its maximum speed $n_{A\ max}$. The curve 80 shows the speed control with relatively high losses, merely by means of a fluid coupling. The slip directly represents the loss. It is, however, possible by means of a fluid coupling downwardly to control the speed range of 0.5 even up to a standstill of the output shaft. This possibility does normally not consist when the control is effected solely by means of a for instance hydrostatically controlled superimposing transmission (curve 81). This curve thus terminates at 0.5. While the degree of efficiency in this instance is relatively good, it has been realized at a speed control range of from 50 to 100% by a rather expensive installation.

The curve 82 corresponds to the installation according to FIGS. 1 and 2. Within the speed range of from 0.5 to 0.75, the control is effected solely with the fluid coupling, and beyond said speed range the control is effected by means of the superimposing transmission. In case that the fluid coupling is bridged, the curve 82a is obtained, otherwise the curve 82b is realized. It will thus be evident that the degree of efficiency is particularly good within the upper speed range, and in the case of the curve 82a is even located above that degree of efficiency which corresponds to the curve 81 (control solely by the hydrostatic superimposing within the entire range of from 0.5 to 1.0). With the arrangement of FIG. 1, due to the relatively small control range, a smaller hydrostatic transmission will suffice which reflects favorably on the price, the reliability and the life of the installation. Moreover, there exists the possibility to control below the value of 0.5.

With regard to costs, the arrangement of FIGS. 3 and 4 is still more advantageous while a degree of efficiency according to curve 83 can be realized. In other words, the degree of efficiency with regard to the cost can be termed rather good. The points 83a to 83e of curve 83 correspond to the five speeds of the electric motor. At the remaining points of curve 83, the control is effected by means of the fluid coupling. The planetary gear transmission may, of course, be also so designed that the five speed steps of the electric motor extend over the entire control range of from 0.5 to 1.0.

Figure 6:
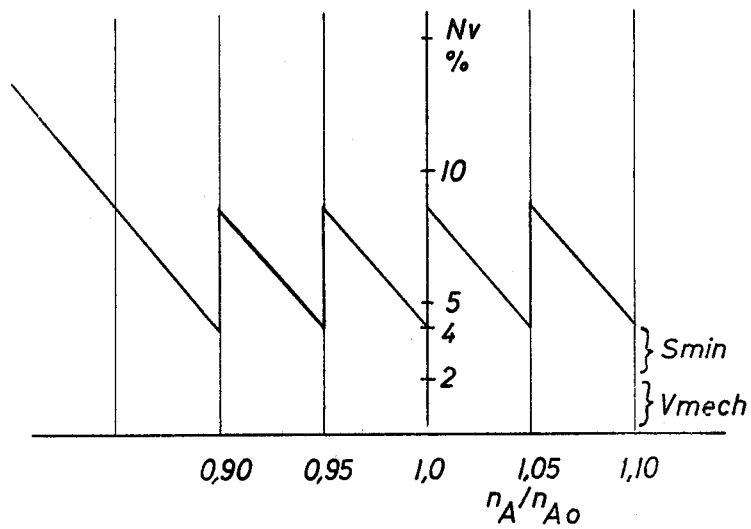
FIGURE 6 is a graph showing the losses caused by the speed and over-speed control of the plants according to FIGS. 3 and 4.

The design of the planetary gear transmission may also be so selected that a speed (over-speed) will be realized which is able of full operational speed $n_{A\,max.}$ of the output shaft. The control losses in this instance are illustrated in FIG. 6. On the abscissa there are plotted the ratios of the respective output speed $n_A$ to the output speed $n_{Ao}$ at the basic transmission ratios. With regard to the specific example of FIGS. 3 and 4, $n_{Ao}$ was 4500 r.p.m. The listed values $n_A/n_{Ao}=1.05$; 0.95 etc. correspond to the output speeds with the fluid coupling 53 completely filled and at the various speed steps of the electric motor 68. Since the fluid coupling in order to be able to transmit a torque has a minimum slip of $S_{min.}$, for instance 2%, and since also the mechanical transmission losses $V_{mech.}$ have a certain value, for instance 2%, the transmission losses $N_v$ amount to at least 4% of the output transmitted at this point of operation. When the fluid coupling 53 is now controlled downwardly for instance by reducing the filling, the speed ratio $n_A/n_{Ao}$ drops, whereas the transmission losses $N_v$ by increasing the slip values in the fluid coupling 53 will rise. The graph of FIG. 6, however, shows that these transmission losses $N_v$ increase only up to approximately 9.0%. Already at this relatively low loss value, the electric motor 68 can be shifted over to the corresponding other side; in which instance only the minimum transmission loss $N_v$ of 4% will be encountered. Below the ratio $n_A/n_{Ao}=0.90$, i.e. at the maximum speed of the electric motor in the corresponding direction of rotation, naturally also a slip control below the value of 7.0% can be effected if necessary. In particular when starting, the starting may be effected with a slip of 100%. Therefore, machines connected to the output shaft 66 and having a high output can be slowly started from the standstill to the uppermost speed, a possibility which does not exist when employing heretofore known superimposing transmissions without employing expensive additional equipment. Incidentally, the driving motor may also be started without load.

FIG. 7 diagrammatically illustrates a power transmission plant in double arrangement for semi-load pumps with a common main driving motor 90 and a common electric motor 91 as drive for the third member of the superimposing transmission. The two main power paths comprise, similar to FIG. 3, in succession: shafts 92 and 93, fluid couplings 94 and 95, intermediate shafts 96 and 97, planetary gear transmissions 98 and 99, output shafts 100 and 101 adapted respectively to be braked by brakes 104 and 105, and semi-load pumps 102 and 103. From the electric motor 91, the superimposing branches lead to the planetary gear transmissions 98 and 99. They consist of shafts 106 and 107, fluid couplings 108 and 109, shafts 110 and 111 adapted respectively to be braked by brakes 112 and 113, and gear pairs 114/115 and 116/117.

The arrangement of FIG. 7 affords particular advantages: the saving of driving elements and a reduced space requirement, the employment of the same type of units and transmission parts which likewise reduces the costs and facilitates the stocking of parts. If desired, also a common control device may be employed. The planetary gear transmissions 98 and 99 are not of the same design so that the same type of semi-load pumps can be employed. The planetary gear transmission 99 turns in the same direction of operation while the other planetary gear transmission 98 turns in the opposite direction. Otherwise this plant is driven in the same manner as the plant described above. The turning off of only one of the semi-load pumps is possible without difficulties while driving the other pump, for instance by emptying the corresponding fluid coupling 94 or 95 and by engaging the brake 104 or 105.

The fluid couplings 108 and 109 similar to the fluid couplings 70 of FIG. 4 are intended to absorb the shocks occurring when starting and when shifting the superimposing machine.

The speed control of the fluid control couplings is, of course, not limited to fluid couplings with scoops. Any other standard types of fluid couplings may be used in connection with the present invention.

It is, of course, to be further understood that the present invention is, by no means, limited to the particular constructions and designs set forth above but also comprises any modifications within the scope of the appended claims.

What is claimed is:

1. A system including a power transmission means for connecting a drive motor with working machine means to be driven at variable speed and comprising, in combination; a three element planetary gear set means, a first one of said elements being connected to said motor, variable speed drive means connected to a second of said elements, a third of said elements being connected to said working machine means, the elements of the planetary gear set being arranged with each other so that said third element rotates faster than said first element in the absence of rotation of said second element, and controllable fluid coupling means in the power transmission means serially connected with said planetary gear set means between said motor and said means to be driven, said variable speed drive means including a fluid motor connected to said second element, a fluid pump driven by said drive motor and hydraulically connected to said fluid motor, and at least one of said fluid pump and fluid motor being variable in stroke.

2. A system including a power transmission means further in combination according to claim 1 in which said elements comprise a sun gear, a ring gear and a planet carrier having planet gears meshing with said sun gear and ring gear, said first element comprising one of said ring gear and planet carrier, said second element comprising the other of said ring gear and planet carrier, said third element comprising said sun gear, and said fluid coupling being interposed between said sun gear and said working machine means and being arranged behind said planetary gear set means when looking in the direction of power flow.

References Cited

UNITED STATES PATENTS

| | | | |
|---|---|---|---|
| 1,395,735 | 11/1921 | Sawyer | 74—675 X |
| 1,702,627 | 2/1929 | Bronander | 74—689 |
| 2,027,218 | 1/1936 | Armington | 74—664 |
| 2,284,758 | 6/1942 | Morton et al. | 74—675 X |
| 2,485,126 | 10/1949 | Wood | 74—687 X |

(Other references on following page)

UNITED STATES PATENTS

| | | | |
|---|---|---|---|
| 2,589,788 | 3/1952 | Fell | 74—675 X |
| 2,666,876 | 1/1954 | Sinclair | 74—675 X |
| 2,745,297 | 5/1956 | Andrus | 74—689 |
| 2,983,164 | 5/1961 | Herndon et al. | 74—730 X |
| 1,984,831 | 12/1934 | Higley | 74—664 |
| 2,004,215 | 6/1935 | Peterson | 74—664 X |
| 2,390,240 | 12/1945 | DeLancey | 74—687 |

FOREIGN PATENTS 877,107    9/1961    Great Britain.

DONLEY J. STOCKING, Primary Examiner

T. C. PERRY, Assistant Examiner

U.S. Cl. X.R.

74—675, 687